(12) United States Patent
Fujisawa et al.

(10) Patent No.: US 7,872,971 B2
(45) Date of Patent: Jan. 18, 2011

(54) GATEWAY UNIT

(75) Inventors: Shin-ichi Fujisawa, Kodaira (JP);
Masahito Endo, Musashino (JP);
Kensuke Hosoya, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 26 days.

(21) Appl. No.: 12/349,835

(22) Filed: Jan. 7, 2009

(65) Prior Publication Data
US 2009/0175284 A1 Jul. 9, 2009

(30) Foreign Application Priority Data
Jan. 9, 2008 (JP) .............................. 2008-001726

(51) Int. Cl.
*G08C 15/00* (2006.01)
(52) U.S. Cl. .................... 370/230; 370/230.1; 370/400; 370/401; 370/402
(58) Field of Classification Search ......... 370/229–232, 370/252–254, 328, 329, 338, 352, 353, 389, 370/392, 395.5, 395.52, 400, 401, 465, 466, 370/478, 402; 709/227–232
See application file for complete search history.

(56) References Cited
U.S. PATENT DOCUMENTS
2006/0215649 A1* 9/2006 Morrall et al. .............. 370/389
2007/0076724 A1* 4/2007 Hall et al. .............. 370/395.52

FOREIGN PATENT DOCUMENTS
JP 2002-132309 A 5/2002
JP 2005-531229 A 10/2005
WO 04/002031 A1 12/2003

* cited by examiner

*Primary Examiner*—Pankaj Kumar
*Assistant Examiner*—Mark A Mais
(74) *Attorney, Agent, or Firm*—Westerman, Hattori, Daniels & Adrian, LLP

(57) ABSTRACT

The invention is to solve the problem in that mutual communication between an IPv6-capble device and an IPv4-capble device has not been carried out in a system wherein the IPv6-capble device and the IPv4-capble device are mixed. An entry of a live list is retrieved when SM Device Annunciation is received from the IPv6-capble device, and a transmission IPv4 address is acquired from an IPv4 address pool if the entry is not found, thereby preparing translation rules so as to be stored in a translation rules storage section, while preparing an entry to be registered in the live list, whereby an IP address in a message is translated with reference to the translation rules. Further, a timestamp of the entry is updated every time when the SM Device Annunciation is received. Even if the address is contained in the message, the mutual communication between the IPv6-capble device and the IPv4-capble device can be carried out, and devices connected to the system can be controlled.

16 Claims, 12 Drawing Sheets

STRUCTURE OF ENTRY

FIG. 4

|  | IPv6 ADDRESS | IPv4 ADDRESS |
|---|---|---|
| SRC | 3ffe:501:ffff:100::bc60 | 192.168.0.23 |
| DST | 3ffe:501:ffff:ffff::c0a8:1 | 192.168.0.1 |

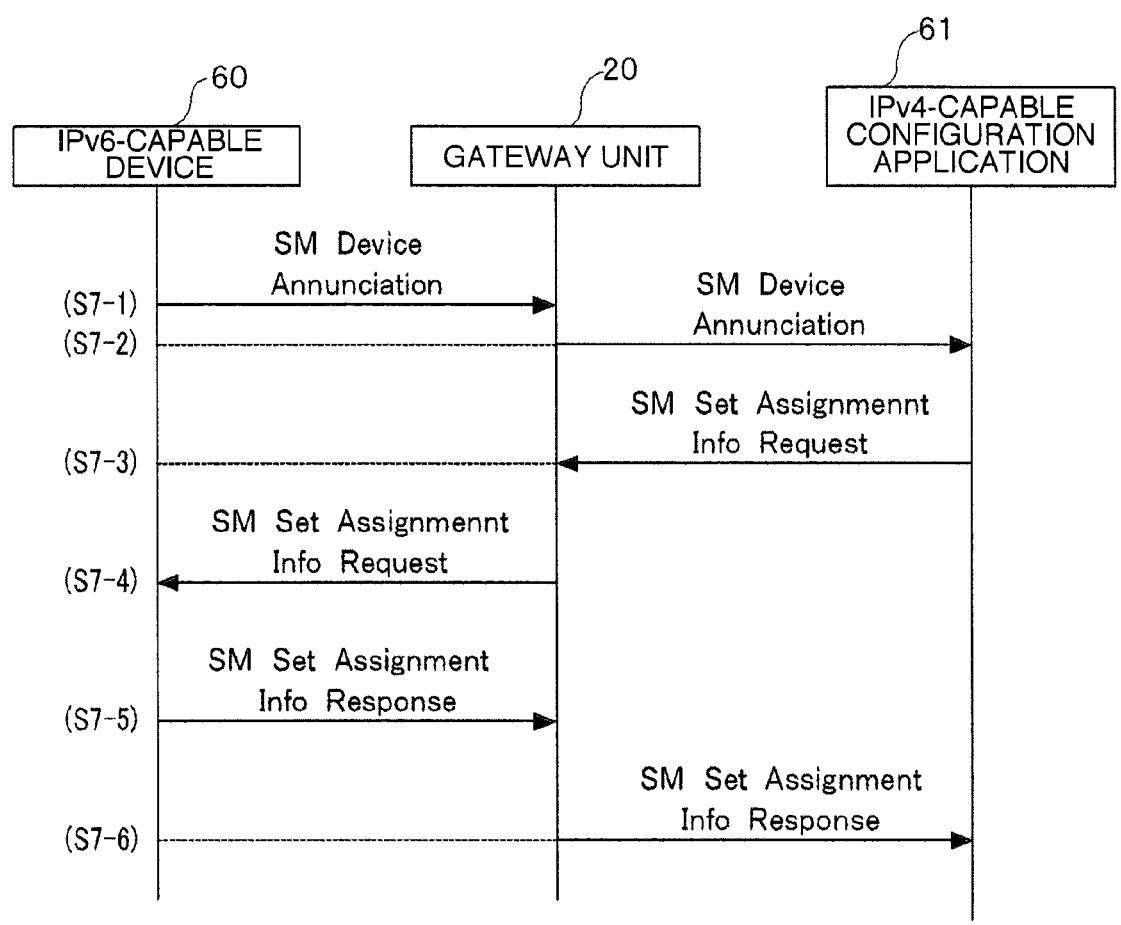

FIG. 8(A)
MESSAGES CONTAINING IP ADDRESS

| Messages containing IP address fields | Names of parameters | Remarks |
|---|---|---|
| SM Device Annunciation | Operational IP Address | |
| SM Set Assignment Info Request | Operational IP Address | |
| SM Find Tag Reply | Queried Object IP Address | |
| SM Identify Response | Operational IP Address | |
| FMS Read Response | IP address or Subnet Mask Field in the Object Dictionary is contained, Readable Object | Only when FMS Read Request in (B) requests |
| FMS Write Request | Readable Object in Object Filed containing Address or Subnet Mask Field | Only when FMS Write Request in (B) requests |

FIG. 8(B)
OBJECTS IN OBJECT DICTIONARY CONTAINING IP ADDRESS FIELDS

| Objects in Object Dictionary containing IP address fields | Names of parameters | Permission |
|---|---|---|
| Operational IP Address | Same as the object name | Readable |
| Local IP Address Array | Same as the object name | Readable |
| Sync and Scheduling Record | Primary Time Server Secondary Time Server | Readable/Writable |
| Nm Characteristics Record | Hse Subnet Mask Bits | Readable/Writable |
| Configured Session Entry Record | Local IP Address Remote IP Address | Readable/Writable |
| Automatic Session Record | Local IP Address Remote IP address | Readable/Writable |
| Hse Configured Vcr Entry Record | Hse Subnet Mask | Readable/Writable |
| Hse Automatic Vcr Entry Record | Hse Subnet Mask | Readable/Writable |
| Current Nma Configuration Access Record | Hse Configurator Ip Address | Readable |
| Previous Nma Configuration Access Record | Hse Configurator Ip Address | Readable |

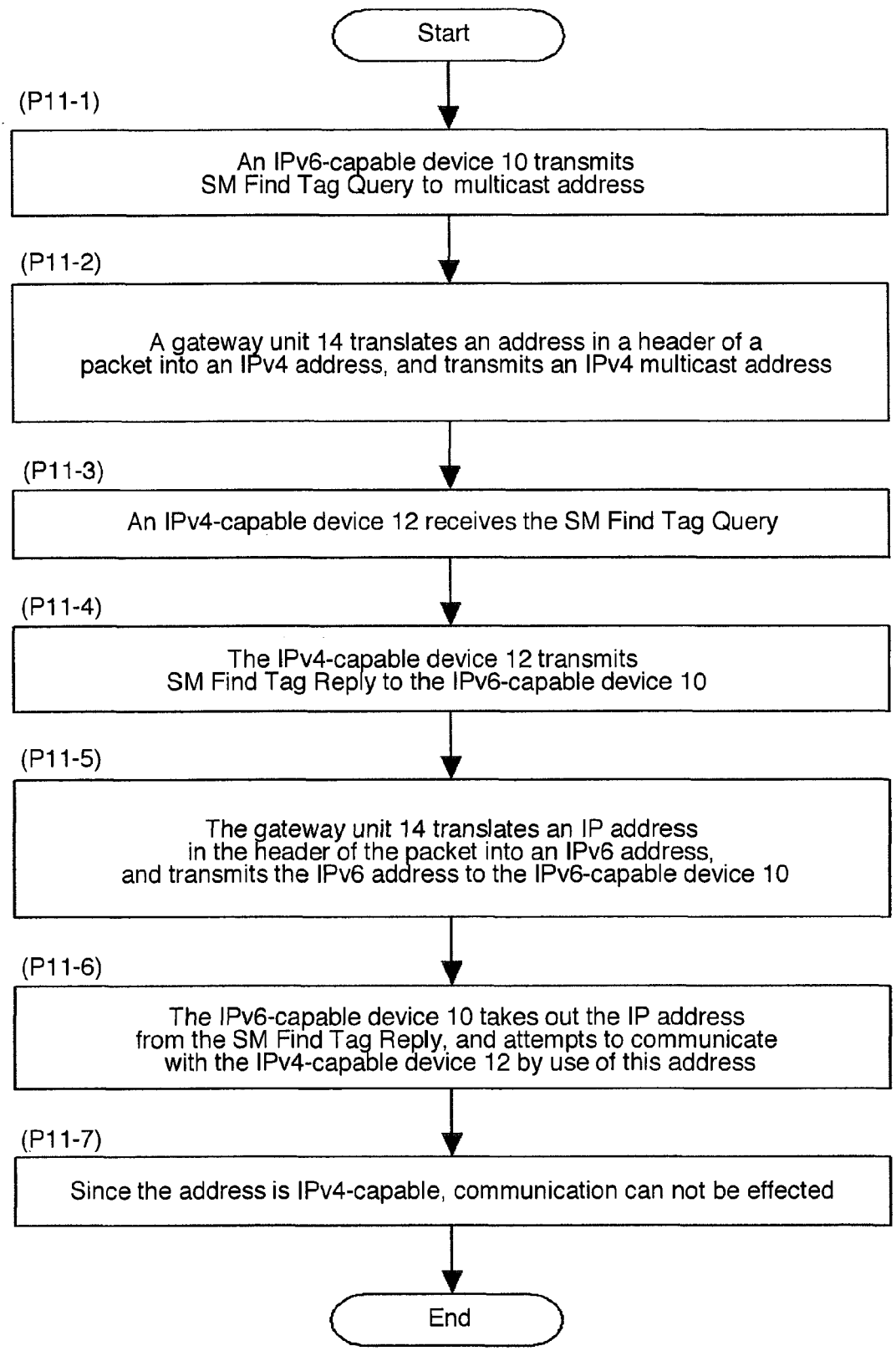

GATEWAY UNIT

FIELD OF THE INVENTION

The present invention relates to a gateway unit having a function for mutual translation between an IPv4 (Internet Protocol Version 4) address and an IPv6 (Internet Protocol Version 6) address, and in particular, to a gateway unit suitable for use in a field bus.

BACKGROUND OF THE INVENTION

A field bus is a bus through which communications between field devices, in service at a factory, and so forth, are carried out.

The field devices in number ranging from several tens to several hundreds are connected to the field bus, and mutual communications between the field devices are carried out via the field bus. By use of the field bus, wiring cost can be reduced, and change/expansion of a system can be flexibly coped with.

The field bus is comprised of two hierarchies, that is, H1 bus, and HSE {High Speed Ethernet (the registered trade name)} bus. While H1 bus has a communication speed at 31.25 kbps, HSE bus is capable of high speed communication, because it is based on Ethernet.

Since HSE bus is based on Ethernet (the registered trade name), communications are executed by use of IP (Internet Protocol). For IP, there exist two protocols, including IPv4 having 32 bits address space, and IPv6 having 128 bits address space. As IP is in the process of transition from IPv4 to IPv6 at present, those two protocols coexist for IP. For execution of communications between a communication device according to IPv4 (an IPv4-capable device) and a communication device according to IPv6 (an IPv6-capable device), IP addresses must be mutually translated.

FIG. 9 shows a system configuration comprising both the IPv4-capable device, and the IPv6-capable device. In FIG. 9, reference numerals 10, 12 denote the IPv6-capable device, and the IPv4-capable device, respectively, while reference numerals 11, 13 denote networks with the devices 10, 12, connected thereto, respectively. The IPv6-capable device is connected to the network 11, and the IPv4-capable device is connected to the network 13.

Reference numeral 14 denotes a gateway unit connecting the network 11 to the network 13. When the IPv6-capable device 10 transmits a packet to the IPv4-capable device 12, an IP address of the transmitted packet is translated into an IPv4 address by the gateway unit 14. Similarly, when the IPv4-capable device 12 transmits a packet to the IPv6-capable device 10, an IP address of the packet is translated from the IPv4 address into an IPv6 address by the gateway unit 14. By so doing, a packet can be mutually translated between the IPv6-capable device 10, and the IPv4-capable device 12.

FIG. 10 is a configuration diagram showing a configuration of the gateway unit 14. In the figure, parts of the gateway unit 14, unrelated to IP address translation, are omitted in description thereof. In FIG. 10, a packet receiving section 14a delivers a received packet to an IP translating section 14b. The IP translating section 14b translates an IP address in the header of the packet as received from IPv4 to IPv6, or in a direction reverse thereto.

At this point in time, the IP translating section 14b makes reference to translation rules stored in a translation rules storage section 14d, thereby translating the IP address. The packet subjected to address translation is inputted to a packet transmitting section 14c before transmission. The translation rules to be stored in the translation rule storage section 14d are normally configured by an operator in advance to be set in the gateway unit 14 prior to operation.

[Patent Document 1] JP 2002-132309 A
[Patent Document 2] JP 2005-531229 A

SUMMARY OF THE INVENTION

However, when an attempt has been made to apply the gateway unit 14 shown in FIG. 10 to a field bus, the following problem has been encountered. In the case of a field device connected to the field bus executing communications by use of the HSE bus, the communications are executed by putting data having a format unique of Foundation Fieldbus onto TCP/UDP (Transmission Control Protocol/User Datagram Protocol). The format unique of Foundation Fieldbus includes IPv4, or IPv6 addresses. Unless those addresses each are translated, it is impossible to carry out mutual communications between the IPv4-capable field device, and the IPv6-capable field device.

With the conventional gateway unit, however, only an address given in the header of a packet is translated, but an address given in the text of the message is not translated. A problem has therefore been encountered in that the conventional gateway unit cannot be applied to the field bus.

This problem is described hereinafter with reference to FIG. 11. In the figure, a system configuration is the same as that shown in FIG. 9 except that the networks 11, 13 each are an HSE-capable field bus, and the IPv6-capable device 10 does not know an IP address of the IPv4-capable device 12.

In FIG. 11, the IPv6-capable field unit 10 transmits SM Find Tag Query for inquiring about an IP address with multicast transmission in step (P11-1). In step (P11-2), this packet is received by the gateway unit 14. The gateway unit 14 translates an address in the header of the packet into an IPv4 address, and transmits the packet by multicast.

In step (P11-3), the IPv4-capable device 12 receives the SM Find Tag Query transmitted by the gateway unit 14. If the IPv4-capable device 12 determines that it is appropriate for the IPv4-capable device 12 itself to respond, the IPv4-capable device 12 transmits SM Find Tag Reply to the IPv6-capable device 10 in step (P11-4). The gateway unit 14 receives this packet, and translates an IP address in the header of the packet into an IPv6 address, and transmits the packet to the IPv6-capable device 10 in step (P11-5). The IP address is included in the SM Find Tag Reply. The IPv6-capable device 10 takes out the IP address from the SM Find Tag Reply, and attempts to communicate with this address, however, since this address is IPv4 address, the IPv6-capable device 10 is unable to handle this address. IPv4 address differs in length from IPv6 address, so that even if the IPv6-capable device 10 regards this address as IPv6-capable, thereby transmitting the packet, the gateway unit 14 is unable to receive the packet because the address is found as improper. In any event, the IPv6-capable device 10 cannot communicate with the IPv4-capable field unit 12 as shown in step (P11-7).

Further, when the IPv4-capable device 12 attempts to communicate with the IPv6-capable device 10, it is not possible to effect communications therebetween either for the same reason.

The same problem arises when the IPv6-capable device receives set information from an IPv4-capable Configuration Application. In case the IPv6-capable device does not have both PD Tag and Device ID of Configuration Application, the IPv6-capable device stores information to that effect in SM Device Annunciation, to be then transmitted by multicast.

As is the case with FIG. 11, since the address in the header of the packet is translated into the IPv4 address by the gateway unit 14, IPv4-capable Configuration Application can receive the SM Device Annunciation. The Configuration Application takes out an IP address from the SM Device Annunciation to thereby attempt to transmit the SM Set Assignment Info Request, however, this address being IPv6-capable, it is not possible to effect transmission for the same reason as described with reference to FIG. 11.

Further, with the conventional gateway unit, an operator has made a point of setting translation rules between the IPv4 address, and the IPv6 address prior to operation, however, as the number of the field devices connected to the field bus increases, so does a burden on the operator, causing a problem in that such a practice as described cannot be effectively implemented. In addition, if the number of the field devices connected to the field bus increases at the time of operation, this has caused a problem in that the conventional gateway unit has had difficulty in coping with such a situation.

It is therefore an object of the invention to provide a gateway unit capable of effecting mutual communications between an IPv4-capable device and an IPv6-capable device, and dynamically generating translation rules for messages.

To that end, in accordance with a first aspect of the invention, there is provided a gateway unit having a function for mutual translation between an IPv6 address and an IPv4 address, said gateway unit comprising a live list for storing entries, each of the entries, containing at least an identifier, an operational IP address, and a transmission IPv4 address, an IPv4 address pool for storing IPv4 addresses, a translation rules storage section for storing translation rules for translating between the IPv6 address and the IPv4 address, an SM Device Annunciation processing section for making reference to an identifier if SM Device Annunciation is received, thereby retrieving the entry corresponding to the identifier, and acquiring an IPv4 address from the IPv4 address pool if the entry is not found while preparing translation rules from the IPv4 address acquired so as to be stored in the translation rules storage section, and preparing an entry to be registered in the live list, a message processing section for making reference to the translation rules stored in the translation rules storage section, thereby executing mutual translation between the IPv4 address and/or the IPv6 address, contained in the message received, an IP translating section for making reference to the translation rules stored in the translation rules storage section, thereby generating respective addresses of a transmission source, and a transmission destination, and a packet transmitting section for generating a packet on the basis of the message processed by the message processing section, and the respective addresses of the transmission source, and the transmission destination, generated by the IP translating section, thereby transmitting the packet. Thus, even if the IP address is contained in the text of the message, the gateway unit is able to serve as a relay in communications between the IPv6-capable device and the IPv4-capable device.

The SM Device Annunciation processing section may make reference to the operational IP address if the message received is not the SM Device Annunciation, thereby searching the live list, and may execute failure management if no entry is found. Thus, an unauthorized message can be detected.

A timestamp is preferably stored in the entry, and the SM Device Annunciation processing section preferably updates the timestamp upon receipt of the SM Device Annunciation. Thus, removal of a field device can be detected.

The entry may be deleted from the live list if the timestamp is not updated for a given time. Thus, the devices connected to a network can be controlled.

In accordance with a second aspect of the invention, there is provided a gateway unit having a function for mutual translation between an IPv6 address and an IPv4 address, said gateway unit comprising a live list for storing entries, each of the entries, containing at least an identifier, an operational IP address, and a transmission IPv4 address, an IPv4 address pool for storing IPv4 addresses, a translation rules storage section for storing translation rules for use in translation between the IPv6 address and the IPv4 address, an SM Device Annunciation processing section for retrieving a relevant entry upon receipt of a message, and acquiring an IPv4 address from the IPv4 address pool if no entry is found while preparing translation rules from the IPv4 address acquired so as to be stored in the translation rules storage section, and preparing an entry to be registered in the live list, a message processing section for making reference to the translation rules stored in the translation rules storage section, thereby executing mutual translation between the IPv4 address and/or the IPv6 address, contained in the message received, an IP translating section for making reference to the translation rules stored in the translation rules storage section, thereby generating respective addresses of a transmission source, and a transmission destination, and a packet transmitting section for generating a packet on the basis of the message processed by the message processing section, and the respective addresses of the transmission source, and the transmission destination, generated by the IP translating section, thereby transmitting the packet. Thus, the gateway unit is able to serve as a relay in communications between the IPv6-capable device, and the IPv4-capable device.

With the gateway unit according to the second aspect of the invention, a timestamp is preferably stored in the entry, and the SM Device Annunciation processing section preferably updates the timestamp upon receipt of a message. Thus, removal of the device can be detected.

With the gateway unit as described above, the SM Device Annunciation processing section preferably refrains from updating the timestamp if the received message is not the SM Device Annunciation, and the retrieved message is one prepared upon receipt of the SM Device Annunciation. Thus, removal of the device can be more accurately detected.

With the gateway unit as described above, the entry may be deleted from the live list if the timestamp is not updated for a given time. Thus, the devices connected to a network can be controlled.

As is evident from description given in the foregoing, the invention has the following advantageous effects.

With respective embodiments of the invention, upon receipt of the SM Device Annunciation, the live list is searched, the IPv4 address is acquired if no entry is found, and translation rules are prepared to be stored while an entry is newly prepared to be thereby registered in the live list, whereupon mutual translation between the IPv6 address and the IPv4 address, contained in the text of message, is implemented by making use of the translation rules.

Even if an IP address is contained in the text of a message, mutual communications between the IPv6-capable device and the IPv4-capable device can be implemented. Accordingly, the invention has an effect that, even in a system where the IPv6-capable device and the IPv4-capable device coexist, mutual communications is possible without being conscious of protocols.

Further, since the translation rules for the IPv6 address and the IPv4 address are automatically prepared, there is no need for an operator setting the translation rules. The invention therefore has an advantage in that a burden on the operator will not increase even if the number of the devices connected to a network increases.

Still further, the invention has an advantage in that the timestamp is updated upon the receipt of the SM Device Annunciation, thereby enabling the devices connected to a network to be controlled.

Yet further, the invention has also an advantage in that by searching the live list even upon receipt of a message other than the SM Device Annunciation, and by preparing the translation rules, and the entry to be registered, an IP address in the message can be translated, and the devices can be controlled even in the case of a device that does not transmit SM Device Annunciation, such as Configuration Application

BRIEF DESCRIPTION OF THE DRAWINGS

FIG. 4 is a configuration diagram showing a translation table held by the gateway unit;

FIG. 7 is a schematic view showing another procedure for message exchange between an IPv6-capable device and an IPv4-capable device;

FIG. 8 is a table explaining about varieties of messages and objects;

FIG. 11 is a view showing a conventional procedure for message exchange between an IPv6-capable device and an IPv4-capable device.

PREFERRED EMBODIMENTS OF THE INVENTION

An embodiment of the invention is described hereinafter with reference to the accompanying drawings. A device referred to hereinafter is a piece of equipment, for communications with HSE. The device periodically transmits SM Device Annunciation with multicast address as reserved in order to notify another device of the device's own presence over a network. The SM Device Annunciation contains at least PD Tag, and/or Device ID, together with Operational IP address.

PD Tag, and Device ID each are an identifier for specifying the device. PD Tag is an identifier provided to enable a user to specify a device over a system, and is not necessarily related to a specific hardware. Device ID is an identifier for uniquely specifying a device, and is given by the manufacturer of the device. Users cannot change Device ID. The SM Device Annunciation normally contains both of, or either of PD Tag, and Device ID. Further, Device ID distinguishes between devices when a redundant configuration is adopted for the devices.

A gateway unit according to the invention receives the SM Device Annunciation, whereupon information contained therein is stored in a live list, thereby enabling mutual communications between an IPv6-capable device, and an IPv4-capable device to be effected. Further, if the gateway unit fails to receive the SM Device Annunciation for a given time, the gateway unit determines that the device is out of order, or has been removed, thereby deleting the same from the live list. Thus, the gateway unit is capable of getting hold of a state of the device to thereby control the same.

Figure 1:
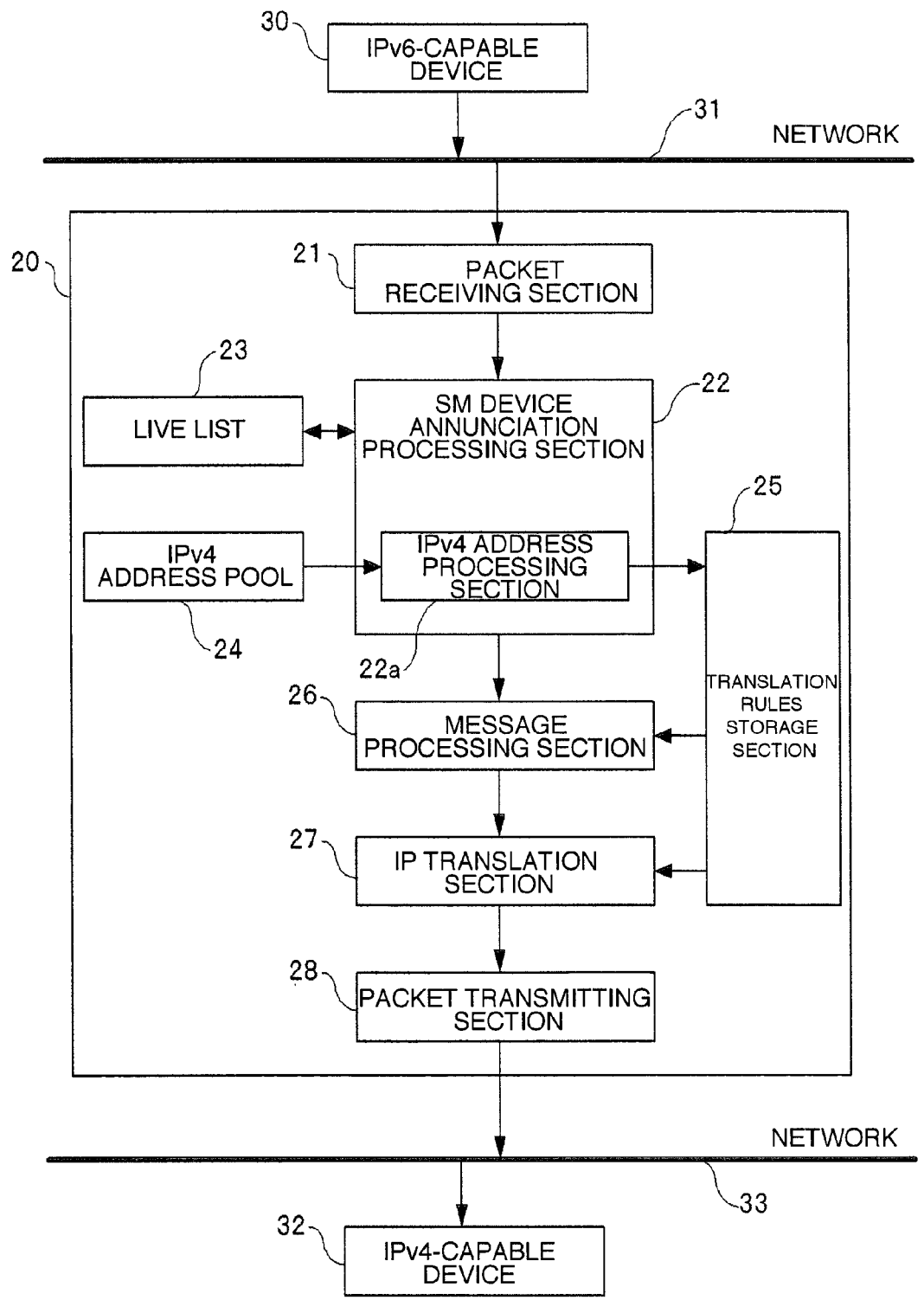
FIG. 1 is a configuration diagram showing one embodiment of a gateway unit according to the invention.

FIG. 1 is a configuration diagram showing one embodiment of a gateway unit according to the invention. In FIG. 1, reference numeral 20 denotes the gateway unit comprising a packet receiving section 21, an SM Device Annunciation processing section 22, a live list 23, an IPv4 address pool 24, a translation rules storage section 25, a message processing section 26, an IP translating section 27, a packet transmitting section 28, and an IPv4 address processing section 22a, disposed inside the SM Device Annunciation processing section 22.

The gateway unit 20 is connected to a network 31, and a network 33, respectively. An IPv6-capable device 30 is connected to the network 31, and an IPv4-capable device 32 is connected to the network 33. That is, a device corresponding to IPv6 is connected to the network 31, and a device corresponding to IPv4 is connected to the network 33. The gateway unit 20 serves as a relay between the networks 31, 33. The devices 30, 32 exchange a packet therebetween via the gateway unit 20, thereby executing communications. Normally, a multitude of devices are connected to the networks 31, 33, respectively, however, in FIG. 1, only one device is connected to the networks 31, 33, respectively.

A packet transmitted by the IPv6-capable device 30 is inputted to the packet receiving section 21. The packet receiving section 21 transacts an IP header, and a TCP/UDP header, in the packet inputted, thereby outputting a message contained in the received packet, an H address of a transmission destination of the message, and an IP address of a transmission source to the SM Device Annunciation processing section 22.

The SM Device Annunciation processing section 22 transacts inputted SM Device Annunciation. More specifically, PD Tag, and Device ID, contained in the message, are registered in the live list 23. At this point in time, the IPv4 address processing section 22a, disposed inside the SM Device Annunciation processing section 22, acquires an IPv4 address from the IPv4 address pool 24.

Figure 2:
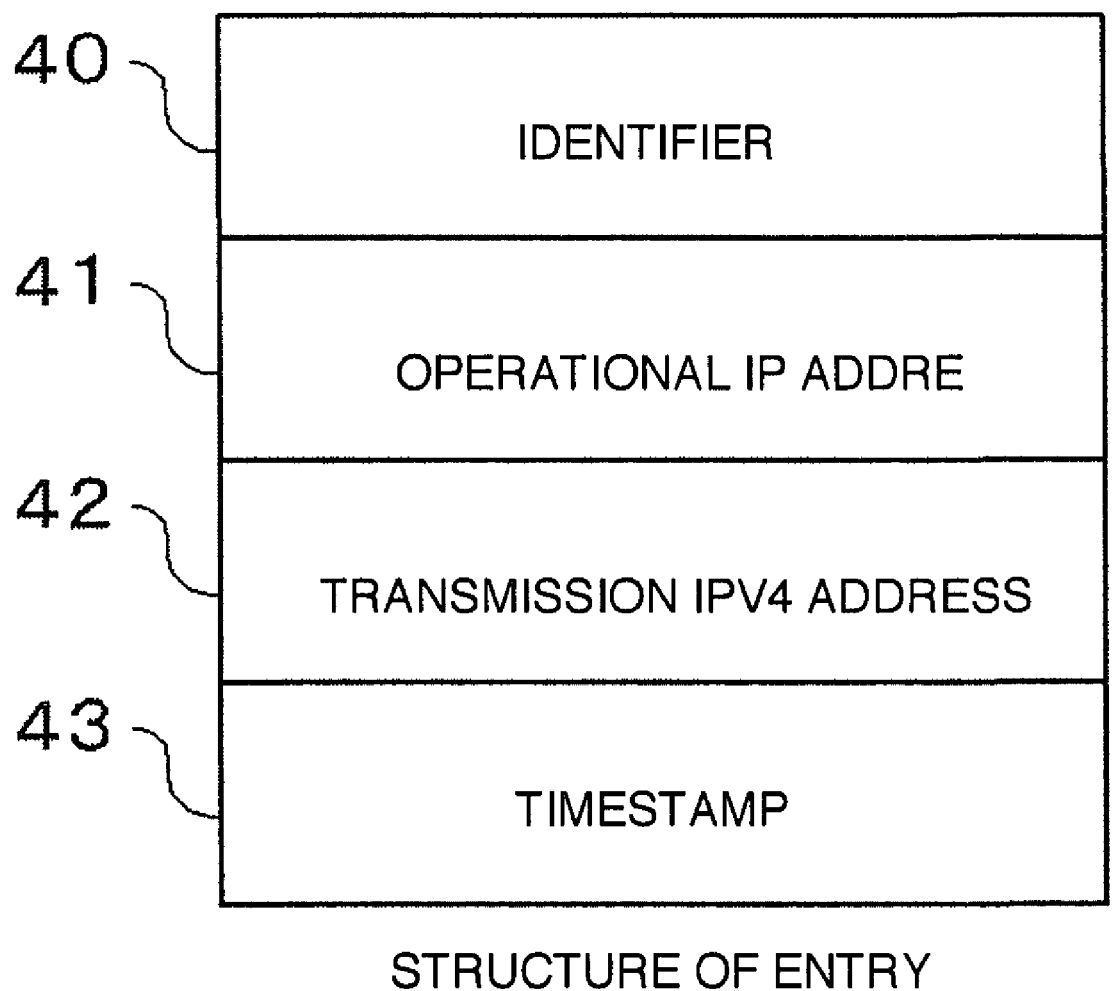
FIG. 2 is a configuration diagram showing an entry of the gateway unit.

The live list 23 is comprised of a table for storing information concerning devices, and a program for controlling the table. The table represents collection of entries in which the information on the devices is stored. FIG. 2 shows a structure of the entry.

In FIG. 2, the entry comprises an identifier 40, an operational IP address 41, a transmission IPv4 address 42, and a timestamp 43. Either of PD Tag, and Device ID, contained in the SM Device Annunciation, or both thereof are stored in the identifier 40. Both Operational IP address contained in the SM Device Annunciation, and data for differentiating the address to determine whether it is the IPv4 address or the IPv6 address are stored in the operational IP address 41.

In the transmission IPv4 address 42, there is stored an IP address for use when the gateway unit transmits the message received from the IPv6-capable device to the IPv4-capable device. Further, when the SM Device Annunciation is received from the IPv4-capable device, this column will become blank.

In the timestamp 43, there is stored a time when the SM Device Annunciation transmitted from a device having PD Tag, and Device ID, stored in the identifier 40, is receive.

The IPv4 address pool 24 is comprised of a storage section for holding IPv4 addresses, and a program for controlling the storage section. The IPv4 addresses to be stored in the storage section are set at the time of starting up the gateway unit 20.

Rules applicable at the time when mutual translation between the IPv6 address and the IPv4 address is to be executed are stored in the translation rules storage section 25. The IPv4 address processing section 22a prepares translation rules upon acquiring the IPv4 address from the IPv4 address pool 24, thereby storing the translation rules in the translation rules storage section 25. The message processing section 26, and the IP translating section 27 make reference to the translation rules stored in the translation rules storage section 25, thereby executing mutual translation between the IPv6 address and the IPv4 address.

Further, translation rules corresponding to multicast address, for use upon multi-casting the SM Device Annunciation, and SM Find Tag Query, are statically defined in the translation rules storage section 25 beforehand.

The translation rules stored in the translation rules storage section 25 vary according to each implementation, but are defined as the set of rules whereby, for example, IPv6 addresses are related to IPv4 addresses corresponding thereto on a one-on-one basis. An example of the rules is shown under item (1) as follows.

$$\text{map from 3ffe : 501 : ffff : 100 : : bc60 to 192. 168. 0. 23} \quad (1)$$

This rule expresses that an IPv6 address at map from 3ffe : 501 : ffff : 100 : : bc60 is translated into an IPv4 address at 192. 168. 0. 23.

The message processing section 26 makes reference to the translation rules stored in the translation rules storage section 25, thereby translating the IPv6 address contained in a message into the IPv4 address, or translating the IPv4 address into the IPv6 address.

The IP translating section 27 makes reference to the translation rules stored in the translation rules storage section 25, and generates combination of protocols to be used, such as TCP/UDP, and so forth, respective IPv6 addresses of the transmission source, and the transmission destination, and a port, and respective IPv4 addresses of the transmission source, and the transmission destination, and a port, on the basis of information acquired from the message received, and the live list 23.

The packet transmitting section 28 generates an IP packet on the basis of the message processed by the message processing section 26, and the respective addresses of the transmission source, and the transmission destination, generated by the IP translating section 27, thereby transmitting the packet.

Further, since the IPv6 address is longer in length than the IPv4 address, the IPv6 address can be generated by use of the IPv4 address. The IPv6 address can be generated, for example, by embedding the IPv4 address in low order 32 bits of the IPv6 address while embedding adequate data in high order 96 bits.

The 96 bits are referred to as NAT-PT (Network Address Translation-Protocol Translation) prefix. If the IPv6 address of the packet received has NAT-PT prefix, the IPv4 address can be extracted from the low order 32 bits of the IPv6 address.

Figure 3:
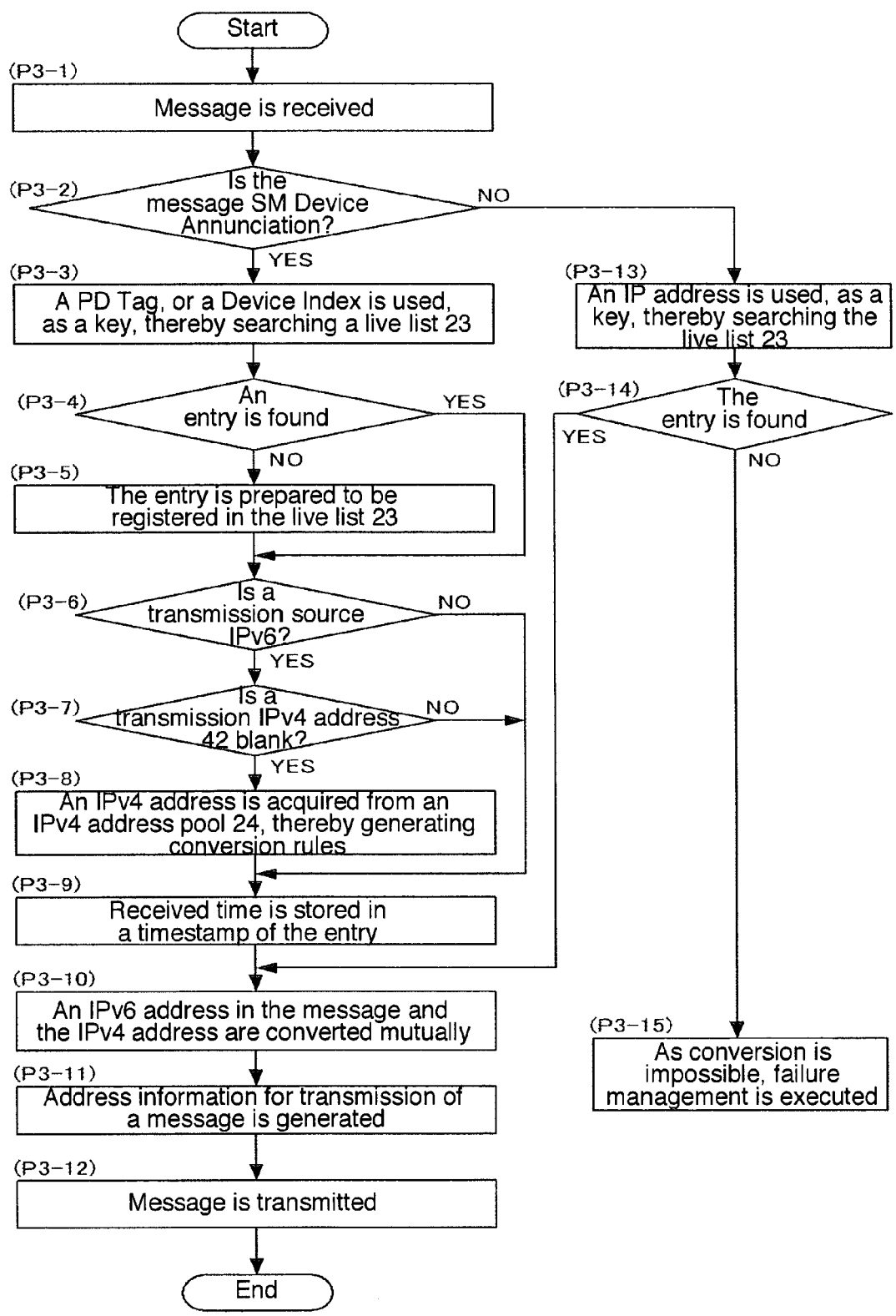
FIG. 3 is a flow chart showing operation of the gateway unit according to one embodiment of the invention.

Now, operation of the present embodiment of the invention is described hereinafter with reference to a flow chart shown in FIG. 3. In steps from (P3-2) to (P3-9), and steps (P3-13), (P3-14), processing is executed by the SM Device Annunciation processing section 22. In FIG. 3, upon receipt of a message in step (P3-1), the SM Device Annunciation processing section 22 determines whether or not this message is SM Device Annunciation in the step (P3-2).

If the message is the SM Device Annunciation (Yes), the SM Device Annunciation processing section 22 makes reference to the identifier 40 by use of PD Tag, or Device ID, contained in the message, as a key, thereby searching the live list 23 in step (P3-3). There can be the case where both PD Tag and Device ID are used as keys.

In step (P3-4), the SM Device Annunciation processing section 22 determines whether or not an entry is found, and if no entry is found (No), the SM Device Annunciation processing section 22 prepares an entry in step (P3-5), stores PD Tag or Device ID in the identifier 40 of the entry, and stores Operational IP address in the operational IP address 41, respectively, so as to be registered in the live list 23. By so doing, it is possible to detect that the devices are connected to a network. Herein, the entry refers to data having the structure shown in FIG. 2.

When the step (P3-5) is completed, or the entry is found in the step (P3-4) (Yes), the SM Device Annunciation processing section 22 determines whether or not an IP address at the transmission source is the IPv6 address in step (P3-6). If an IP address at the transmission source is the IPv6 address (Yes), the SM Device Annunciation processing section 22 examines whether or not the transmission IPv4 address 42 of the entry as prepared, or retrieved is blank in step (P3-7).

If the transmission IPv4 address 42 is found blank (Yes), the IPv4 address processing section 22a acquires one of the IPv4 addresses from the IPv4 address pool 24 in step (P3-8), thereby storing the IPv4 address in the transmission IPv4 address 42, and rendering the IPv4 address usable by the gateway unit. Subsequently, translation rules are prepared from the IPv4 address, and the IPv6 address at the transmission source to be thereby stored in the translation rules storage section 25. The translation rules are as shown, for example, under item (1) as previously described.

To render the IPv4 address usable by the gateway unit 20 means that, for example, the following processing is executed. The gateway unit 20 holds a translation table for translation between the IPv6 address and the IPv4 address, and executes mutual translation between the IPv6 address and the IPv4 address on the basis of the translation table. An example of the translation table is shown in FIG. 4. SRC refers to an address of the transmission source, and DST refers to an address of the transmission destination.

Upon arrival of a packet from the IPv6-capable device, the IPv6 address of SRC and the IPv6 address of DST can be decided on the basis of the packet. The IPv4 address of DST is generated from the low order 32 bits of the IPv6 address of DST. As the IPv4 address of SRC cannot be generated from the IPv6 address, the IPv4 address of SRC is acquired from the IPv4 address pool 24, thereby storing the IPv4 address therein. If the translation table is completed in this way, this will enable the gateway unit 20 to make use of the IPv4 address.

The IPv4 address processing section 22a acquires an optional address from the IPv4 address pool 24. For example, an IPv4 address positioned at the head of addresses held by a list structure is acquired. The IPv4 address acquired is deleted from the IPv4 address pool 24.

If an IP address at the transmission source is not the IPv6 address in the step (P3-6) (No), or if the transmission IPv4 address 42 is not blank in the step (P3-7) (No), step (P3-8) is skipped over. Upon completion of the step (P3-8), or after skipping over the step (P3-8), a timestamp of the entry as prepared, or retrieved is updated at the received time of the SM Device Annunciation in the step (P3-9). By making reference to the timestamp, it is possible to find out the last received time of the SM Device Annunciation.

Next, if the IP address is contained in the message in step (P3-10), the message processing section 26 makes reference to the translation rules stored in the translation rules storage section 25, thereby translating the IP address from the IPv6 address into the IPv4 address, and vice versa.

Then, the IP translating section 27 makes reference to the translation rules stored in the translation rules storage section 25 in step (P3-11), thereby generating address information necessary for transmission of a message received, on the basis of the message received, and information acquired by searching the live list. Next, in step (P3-12), the packet transmitting section 28 generates a packet on the basis of the message processed by the message processing section 26, and respective addresses of the transmission source, and the transmission destination, thereby transmitting the packet to the network 33.

If the message is not the SM Device Annunciation in the step (P3-2) (No), the SM Device Annunciation processing section 22 makes reference to the operational IP address 41 by use of an IP address, as a key, thereby searching the live list 23 in step (P3-13). In step (P3-14), the SM Device Annunciation processing section 22 determines whether or not an entry is found, and if no entry is found (No), the SM Device Annunciation processing section 22 decides that translation is impossible, failure management is executed in step (P3-15). On the other hand, if an entry is found (Yes), the operation proceeds to the step (P3-10).

As far as the device is connected to the network, and no failure occurs, the device keeps transmitting the SM Device Annunciation with multicast address at a given cycle. Accordingly, if the SM Device Annunciation is not received for a given time, for example, for a time length several times or more as long as the given cycle, it is possible to determine that the device has been removed from the network, or the device is not functioning.

As described with reference to FIG. 3, when the SM Device Annunciation is received, the timestamp 43 of the relevant entry in the live list 23 is updated at the received time of the SM Device Annunciation. Accordingly, the SM Device Annunciation processing section 22 periodically checks the entries of the live list 23, thereby determining that a timestamp of an entry, old as long as the given time, is the entry that has already been removed or is out of order, thereby deleting the same from the live list 23. At this point in time, the transmission IPv4 address 42 of the entry to be deleted is returned to the IPv4 address pool 24. By so doing, this IPv4 address can be reused when a new entry is prepared.

Figure 5:
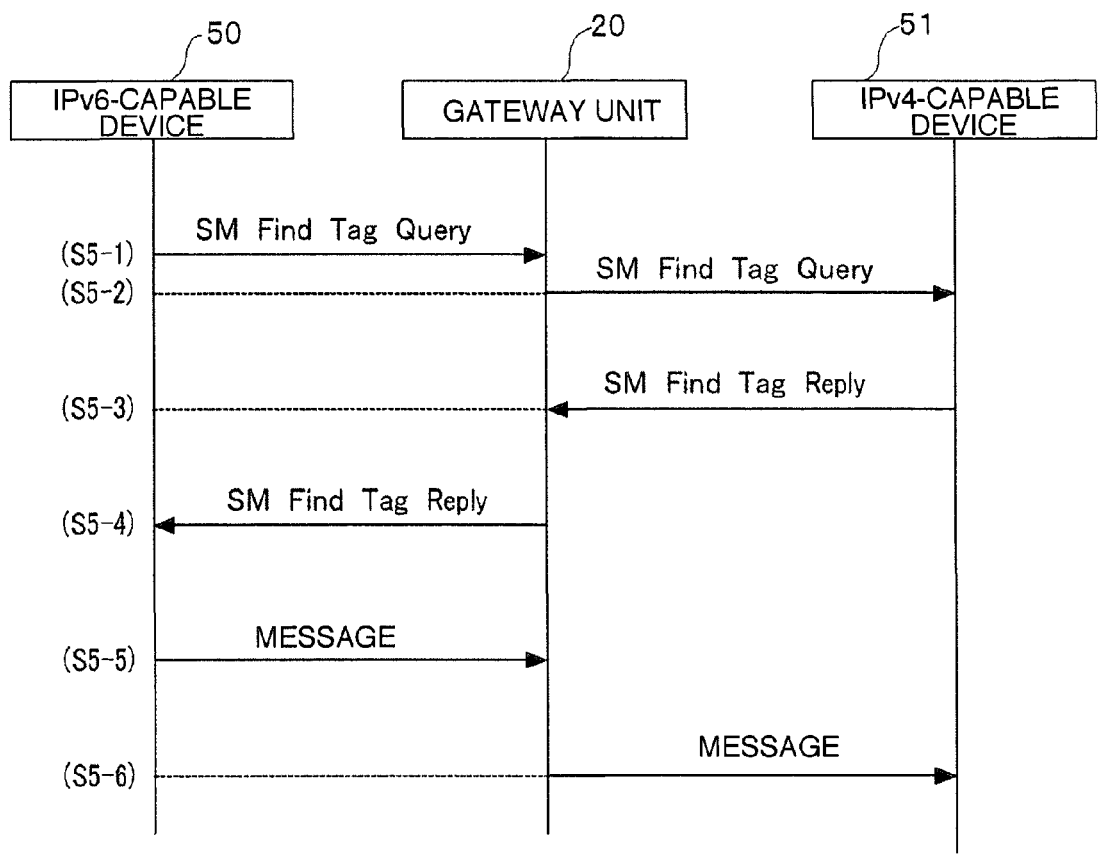
FIG. 5 is a schematic view showing a procedure for message exchange between an IPv6-capable device and an IPv4-capable device.

Next, the case of the IPv6-capable device communicating with the IPv4-capable device is described hereinafter. FIG. 5 is a schematic view showing a procedure whereby an IPv6-capable device 50 communicates with an IPv4-capable device 51 via the gateway unit 20. Further, it is assumed that the SM Device Annunciation has already been transmitted, and the gateway unit 20 has registered entries of the IPv6-capable device 50.

In step (S5-1), the IPv6-capable device 50 attempts to communicate with the IPv4-capable device 51. If an IP address of the other party of communication is unknown at this point in time, the IPv6-capable device 50 transmits SM Find Tag Query to multicast address.

The gateway unit 20 receives the SM Find Tag Query. Since SM Find Tag Query is a message transmitted from the IPv6-capable device 50, the SM Device Annunciation processing section 22 searches the live list 23. Since the relevant entry has already been registered, this entry is acquired. Since the transmission IPv4 address has already been assigned, the IPv4 address processing section 22a executes no operation. Further, since the IP address is not contained in the SM Find Tag Query, the message processing section 26 executes no operation either.

The IP translating section 27 acquires IPv4 multicast address from the translation rules, and the IPv4 address at a transmission source from the entry, respectively. The packet transmitting section 28 affixes the respective IPv4 addresses of the transmission source and the transmission destination, acquired by the IP translating section 27, to the SM Find Tag Query as received, and transmits SM Find Tag Query thus modified to the multicast address. The IPv4-capable device 51 receives the SM Find Tag Query described as above {step (S5-2)}.

If the IPv4-capable device 51 determines that it is appropriate for the IPv4-capable device 51 itself to respond, the IPv4-capable device 51 transmits SM Find Tag Reply to the IPv6-capable device 50 in step (S5-3). The SM Find Tag Reply is received by the gateway unit 20.

The SM Device Annunciation processing section 22 searches the live list 23. Since the IPv6-capable device 50 at the transmission destination has already been registered, an entry can be acquired. Since this message is one transmitted from the IPv4-capable device 51, the IPv4 address processing section 22a executes no operation.

The message processing section 26 makes reference to the translation rules, thereby translating the IPv4 address contained in the message into the IPv6 address. The IP translating section 27 acquires an IPv6 address at the transmission source from the SM Find Tag Reply as received, and an IPv6 address at the transmission destination from the entry, respectively. The packet transmitting section 28 affixes the IP addresses at the transmission source, and the transmission destination, respectively, acquired by the IP translating section 27, to the SM Find Tag Reply as translated by the message processing section 26, thereby transmitting SM Find Tag Reply thus modified to the IPv6-capable device 50 {step (S5-4)}.

The IPv6-capable device 50 starts communication with the IPv4-capable device 51 by use of the IPv6 address contained in the SM Find Tag Reply as received. For that purpose, the IPv6-capable device 50 transmits a message in step (S5-5). This message is received by the gateway unit 20.

The SM Device Annunciation processing section 22 searches the live list 23, thereby acquiring an entry. Since the transmission IPv4 address has already been assigned, the IPv4 address processing section 22a executes no operation. If an IPv6 address is found in the message, the message processing section 26 makes reference to the translation rules, thereby executing translation from the IPv6 address to the IPv4 address. The IP translating section 27 makes reference to the translation rules, thereby acquiring the IPv4 address at the transmission destination from the message, and the IPv4 address at the transmission source from an entry as retrieved, respectively. The packet transmitting section 28 affixes the addresses acquired by the IP translating section 27, to the message, and transmits the message thus modified to the IPv4-capable device 51. The IPv4-capable device 51 receives this message {step (S5-6)}.

Thus, the IPv6 address in the text of the message as well as the header of the message is translated into the IPv4 address by the gateway unit 20, so that the IPv6-capable device 50 is able to communicate with the IPv4-capable device 51.

Further, in the case where the IPv4-capable device attempts to communicate with the IPv6-capable device, communication can be effected through mutual translation between the IPv4 address, and the IPv6 address, according to a similar procedure, to be executed by the gateway unit 20. In this case, the IPv6 address can be uniquely generated from the IPv4 address, as previously described, so that mechanisms corresponding to the IPv4 address processing section 22a, and the IPv4 address pool 24 are unnecessary.

Figure 6:
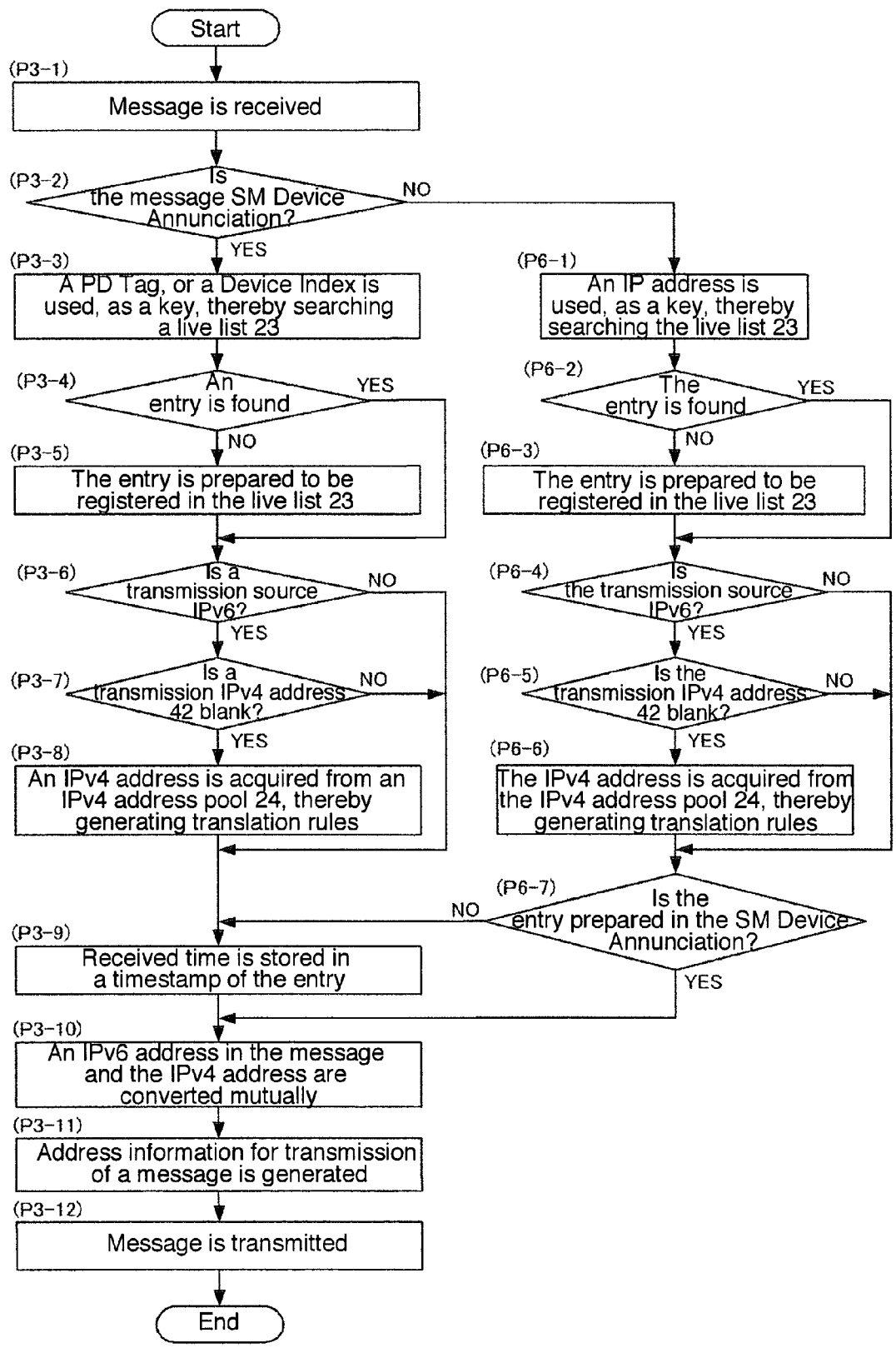
FIG. 6 is a flow chart showing operation of a gateway unit according to another embodiment of the invention.
Figure 9:
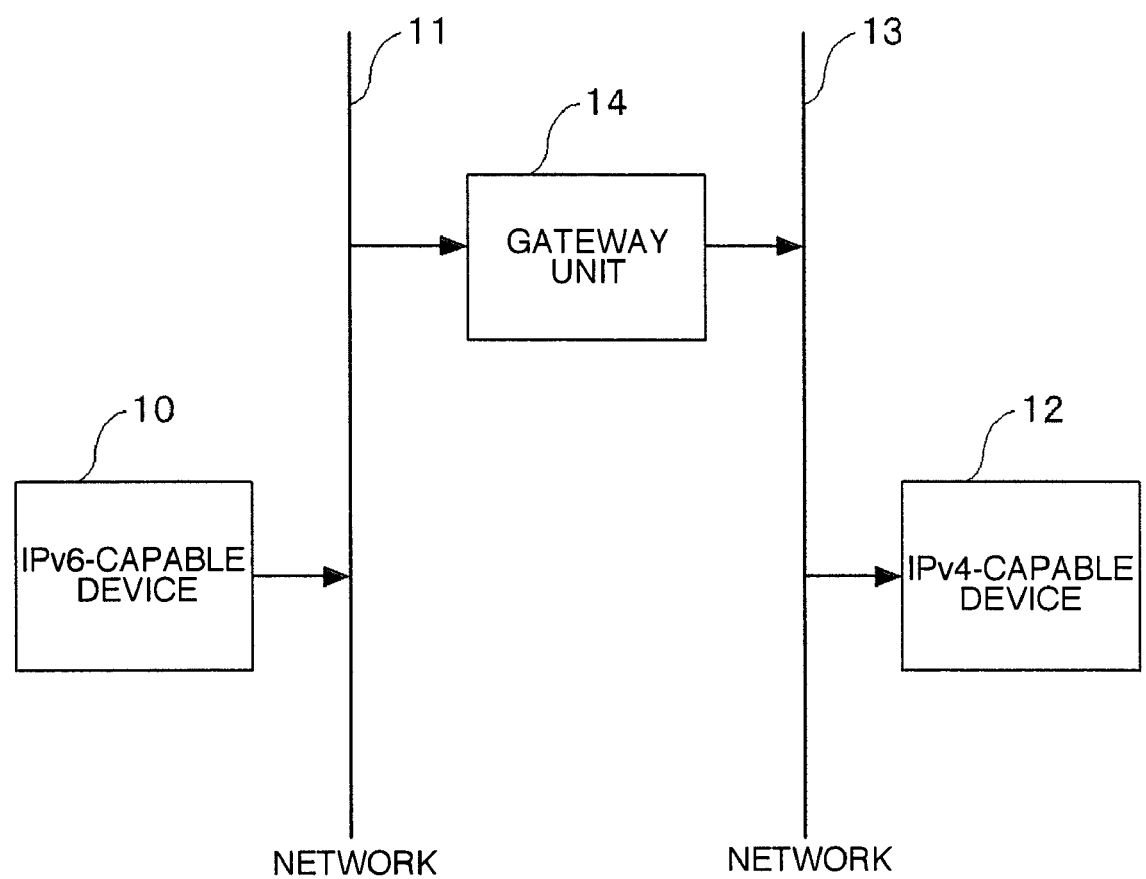
FIG. 9 is a configuration diagram showing a system comprising both an IPv6-capable device and an IPv4-capable device.
Figure 10:
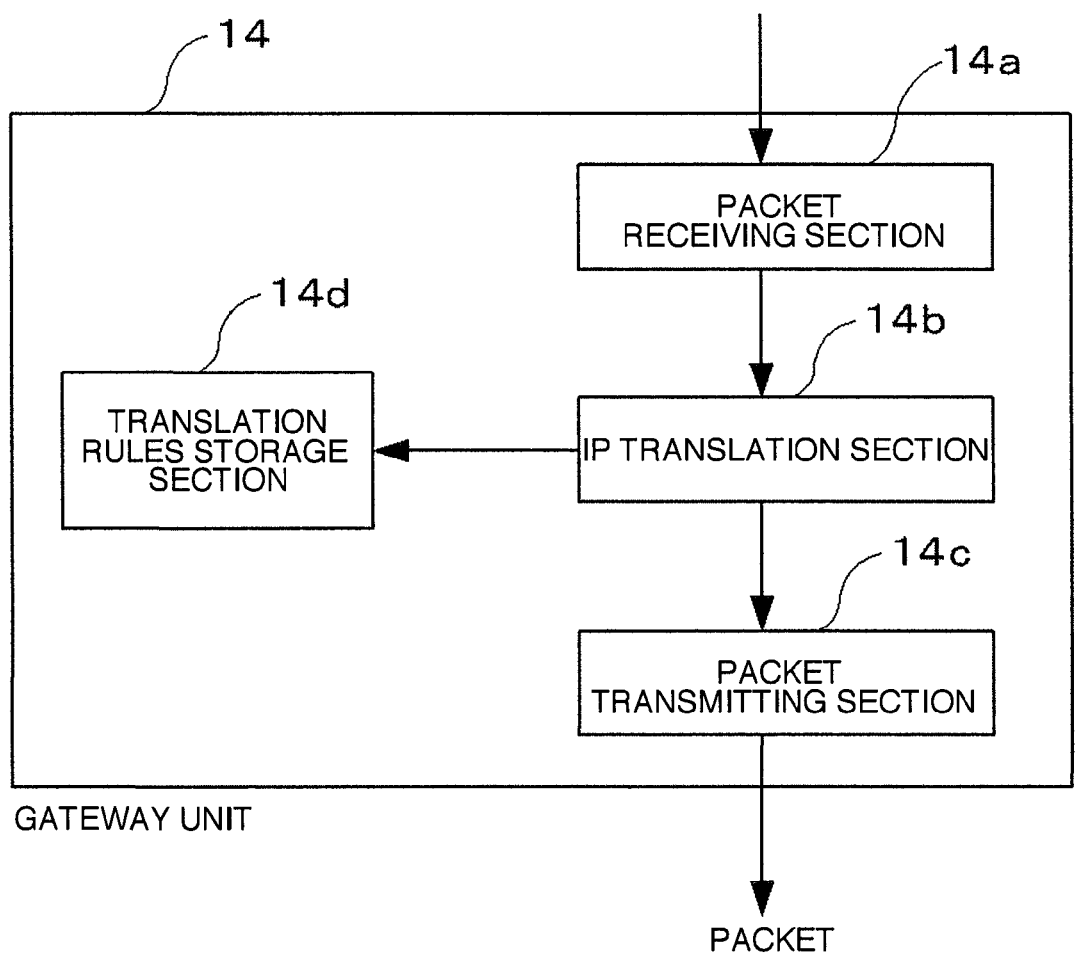
FIG. 10 is a configuration diagram showing a conventional gateway unit.

There exists a device that does not transmit the SM Device Annunciation in devices connected to a network, such as Configuration Application. By changing meaning of respective items in an entry, and a processing procedure thereof, it is possible to cope with such a device. Referring to FIGS. 2 and 6, such an embodiment of the invention is described hereinafter.

First, the entry is explained. In FIG. 2, either PD Tag or Device ID, or both thereof are stored in the identifier 40, however, in the case of the device that does not transmit the SM Device Annunciation, such as Configuration Application, the identifier 40 is kept blank.

The Operational IP address stored in the SM Device Annunciation is stored in the operational IP address 41, however, in the case of the device that does not transmit the SM Device Annunciation, the IP address at the transmission source is stored in the operational IP address 41. Further, the data for differentiating the address between the IPv4 address and the IPv6 address, together with the IP address at the transmission source, are stored in the operational IP address 41.

As with the case of the embodiment shown in FIG. 3, the IPv4 address acquired by the IPv4 address processing section 22a is stored in the transmission IPv4 address 42. However, the entries of the live list 23 are prepared not only at the time of receiving the SM Device Annunciation, but also at the time of receiving other messages. Further, the transmission IPv4 address 42 of an entry prepared by a message received from the IPv4-capable device becomes blank.

The timestamp 43 is updated even at the time of receiving a message other than the SM Device Annunciation. However, the timestamp of an entry prepared at the time of receiving the SM Device Annunciation is updated only at the time of receiving the SM Device Annunciation.

Next, a processing procedure is described with reference to FIG. 6. In the figure, constituents identical to those in FIG. 3 are denoted by like reference numerals, thereby omitting description thereof. A flow chart shown in FIG. 6 differs from the flow chart in FIG. 3 only in respect of a process step where a message received is not the SM Device Annunciation. If the message is not the SM Device Annunciation in the step (P3-2) (No), the SM Device Annunciation processing section 22 makes reference to the operational IP address 41 by use of the IP address, as a key, thereby searching the live list 23 in step (P6-1).

Respective steps from (P6-2) to (P6-6) are the same as the respective steps from (P3-4) to (P3-8), thereby omitting description thereof. In step (P6-7), the SM Device Annunciation processing section 22 checks whether or not an entry is one prepared in the SM Device Annunciation, and only in the case where the entry is not originated from the SM Device Annunciation (No), the timestamp of the entry is updated in step (P3-9).

FIG. 7 is a flow chart showing the case where an IPv6-capable device 60 is started up, and setting is received from an IPv4-capable Configuration Application 61. In this case, it is assumed that the IPv6-capable device 60 has neither PD Tag nor Device ID.

In FIG. 7, upon startup of the IPv6-capable device 60, in step (S7-1), information to the effect that the IPv6-capable device 60 has neither PD Tag nor Device ID is stored in the SM Device Annunciation to be thereby transmitted to multicast address. The SM Device Annunciation is received by the gateway unit 20.

The gateway unit 20 executes the processing as described with reference to the flow chart shown in FIG. 3. The SM Device Annunciation being a first SM Device Annunciation from the IPv6-capable device 60, an entry is registered in the live list 23. The IPv4 address processing section 22a acquires an IPv4 addresses from the IPv4 address pool 24 to be set in the transmission IPv4 address 42, thereby preparing translation rules to be stored in the translation rules storage section 25. The message processing section 26 translates the IPv6 address contained in a message into the IPv4 address, and the IP translating section 27 makes reference to the translation rules, thereby acquiring IPv4 multicast address, and an IPv4 address at the transmission source from the IPv4 address acquired by the IPv4 address processing section 22a. The packet transmitting section 28 generates a packet on the basis of those acquired addresses, and the translated message, thereby transmitting the packet by multicast.

In step (S7-2), the SM Device Annunciation transmitted from the gateway unit 20 is received by the IPv4-capable Configuration Application 61. As neither PD Tag, nor Device ID is stored in the SM Device Annunciation, the IPv4-capable Configuration Application 61 transmits SM Set Assignment Info Request to the IPv4 address contained in the SM Device Annunciation received (to the IPv6-capable device 60) {step (S7-3)}.

The SM Set Assignment Info Request is received by the gateway unit 20. As the SM Set Assignment Info Request as received is one transmitted from the IPv4-capable device (Configuration Application 61), the SM Device Annunciation processing section 22 searches the live list 23. Since an entry for the IPv6-capable device 60 has already been prepared, the entry is acquired. Since this is the case of transmission from the IPv4-capable device, the IPv4 address processing section 22a executes no operation.

The message processing section 26 makes reference to the translation rules, thereby translating an IP address of the IPv4-capable Configuration Application 61, contained in the SM Set Assignment Info Request, into an IPv6 address. The IP translating section 27 acquires the IPv6 address of the transmission source from the message processing section 26, and the IPv6 address of the transmission destination from the entry of the live list 23, respectively. The packet transmitting section 28 affixes the respective addresses of the transmission source, and the transmission destination, acquired by the IP translating section 27, to the SM Set Assignment Info Request as processed by the message processing section 26, thereby transmitting the SM Set Assignment Info Request thus modified to the IPv6-capable device 60. The IPv6-capable device 60 receives the SM Set Assignment Info Request {step (S7-4)}.

In {step (S7-5)}, the IPv6-capable device 60 transmits SM Set Assignment Info Response to the IPv6 address contained in the SM Set Assignment Info Request. The SM Set Assignment Info Response is received by the gateway unit 20.

The SM Device Annunciation processing section 22 searches the live list 23, thereby acquiring an entry. The IPv4 address processing section 22a and the message processing section 26 execute no operation. The IP translating section 27 makes reference to the translation rules, thereby acquiring the IPv4 address of the transmission destination from the SM Set Assignment Info Response, and the IPv4 address of the transmission source from the entry of the live list 23, respectively. The packet transmitting section 28 affixes the respective IPv4 addresses of the transmission source and the transmission destination, to the SM Set Assignment Info Response as received, and transmits the SM Set Assignment Info Response thus modified to the IPv4-capable Configuration Application 61. The IPv4-capable Configuration Application 61 receives the SM Set Assignment Info Response {step (S7-6)}.

With the present embodiment of the invention, as well, there is executed mutual translation between the IPv6 address and the IPv4 address within a message, so that the IPv6-capable device 60 is able to communicate with the IPv4-capable Configuration Application 61.

Further, in the case where the IPv4-capable device attempts to communicate with an IPv6-capable Configuration Application, the same applies. In this case, the IPv4 address contained in the SM Device Annunciation transmitted by the IPv4-capable device is translated into the IPv6 address, and the IPv6 address contained in the SM Set Assignment Info Request transmitted by the IPv6-capable Configuration Application is translated into the IPv4 address, thereby enabling communications between those devices to be effected.

Further, if the device transmitting the SM Device Annunciation has PD Tag, or Device ID, PD Tag and Device ID may be stored in the first SM Device Annunciation to be then transmitted. In this case, the SM Set Assignment Info Request, and the SM Set Assignment Info Response are not generated.

Further, messages, each thereof containing an IP address, include other messages, such as SM Identify Response, FMS Read Response, and FMS Write Response, besides those messages described in the foregoing. With those other messages, the transmission IPv4 address, and the translation rules thereof are automatically generated, and IP addresses contained in a message are automatically translated, so that the IPv6-capable device can communicate with the IPv4-capable device without being conscious of protocols.

In FIG. 8, a table showing varieties of messages, each thereof containing an IP address field, and a table of objects in Object Dictionary are shown. FIG. 8 (A) is the table showing the varieties of the messages, each thereof containing the IP address field. The messages containing respective IP addresses include SM Device Annunciation, SM Set Assignment Info Request, SM Find Tag Reply, SM Identify Response, FMS Read Response, and FMS Write Response. Operational IP Address is contained in the second and fourth messages, respectively, and Queried Object IP Address is contained in the third message. Objects in Object Dictionary are contained in the last two messages.

FIG. 8 (B) is the table showing the objects in Object Dictionary containing IP address fields, the table containing Operational IP Address, and other objects.

What is claimed is:

1. A gateway unit having a function for mutual translation between an Ipv6 address and an Ipv4 address, said gateway unit comprising:
   a live list for storing entries, each of the entries, containing at least an identifier, an operational IP address, and a transmission Ipv4 address;
   an Ipv4 address pool for storing Ipv4 addresses;
   a translation rules storage section for storing translation rules for use in translation between the Ipv6 address and the Ipv4 address;
   an SM Device Annunciation processing section for making reference to an identifier if a message received is SM Device Annunciation, a multicast transmission in field bus communication between Ipv4-capable and Ipv6-capable field devices connected to a field bus executing HSE (High Speed Ethernet) communications, thereby retrieving the entry corresponding to the identifier, and acquiring an Ipv4 address from the Ipv4 address pool if the entry is not found while preparing translation rules from the Ipv4 address acquired so as to be stored in the translation rules storage section, and preparing an entry to be registered in the live list;
   a message processing section for making reference to the translation rules stored in the translation rules storage section, thereby executing mutual translation between the Ipv4 address and/or the Ipv6 address contained in the message received;
   an IP translating section for making reference to the translation rules stored in the translation rules storage section, thereby generating respective addresses of a transmission source and a transmission destination; and
   a packet transmitting section for generating a packet on the basis of the message processed by the message processing section, and the respective addresses of the transmission source, and the transmission destination, generated by the IP translating section, thereby transmitting the packet.

2. The gateway unit according to claim 1, wherein the SM Device Annunciation processing section makes reference to the operational IP address if the message received is not the SM Device Annunciation, thereby searching the live list, and executes failure management if no entry is found.

3. The gateway unit according to claim 1, wherein a timestamp is stored in the entry, and the SM Device Annunciation processing section updates the timestamp upon receipt of the SM Device Annunciation.

4. The gateway unit according to claim 3, wherein the entry is deleted from the live list if the timestamp is not updated for a given time.

5. A gateway unit having a function for mutual translation between an Ipv6 address and an Ipv4 address, said gateway unit comprising:
   a live list for storing entries, each of the entries, containing at least an identifier, an operational IP address and a transmission Ipv4 address;
   an Ipv4 address pool for storing Ipv4 addresses;
   a translation rules storage section for storing translation rules for use in translation between the Ipv6 address and the Ipv4 address;
   an SM Device Annunciation processing section for retrieving an entry upon receipt of a message in field bus communication between Ipv4-capable and Ipv6-capable field devices connected to a field bus executing HSE (High Speed Ethernet) communications, and acquiring an Ipv4 address from the Ipv4 address pool if no entry is found while preparing translation rules from the Ipv4 address acquired so as to be stored in the translation rules storage section, and preparing an entry to be registered in the live list;
   a message processing section for making reference to the translation rules stored in the translation rules storage section, thereby executing mutual translation between the Ipv4 address and/or the Ipv6 address contained in the message received;

an IP translating section for making reference to the translation rules stored in the translation rules storage section, thereby generating respective addresses of a transmission source, and a transmission destination; and a packet transmitting section for generating a packet on the basis of the message processed by the message processing section, and the respective addresses of the transmission source and the transmission destination, generated by the IP translating section, thereby transmitting the packet.

6. The gateway unit according to claim 5, wherein a timestamp is stored in the entry, and the SM Device Annunciation processing section updates the timestamp upon receipt of a message.

7. The gateway unit according to claim 6, wherein the SM Device Annunciation processing section refrains from updating the timestamp if the message received is not the SM Device Annunciation, and the entry retrieved is one prepared upon receipt of the SM Device Annunciation.

8. The gateway unit according to claim 6, wherein the entry is deleted from the live list if the timestamp is not updated for a given time.

9. A method for mutual translation between an Ipv6 address and an Ipv4 address in a gateway unit, comprising:

storing entries in a live list, each of the entries containing at least an identifier, an operational IP address, and a transmission Ipv4 address;

storing Ipv4 addresses in an Ipv4 address pool;

storing translation rules in a translation rules storage section for use in translation between the Ipv6 address and the Ipv4 address;

retrieving the entry corresponding to an identifier, if a message received is SM Device Annunciation, a multicast transmission in field bus communication between Ipv4-capable and Ipv6-capable field devices connected to a field bus executing HSE (High Speed Ethernet) communications, and acquiring an IPv4 address from the IPv4 address pool if the entry is not found while preparing translation rules from the IPv4 address acquired so as to be stored in the translation rules storage section, and preparing an entry to be registered in the live list;

mutually translating between the IPv4 address and/or the IPv6 address contained in the message received by making reference to the translation rules stored in the translation rules storage section;

generating respective addresses of a transmission source and a transmission destination by making reference to the translation rules stored in the translation rules storage section; and transmitting a packet generated based on the translated IPv4 address and/or the IPv6 address of the message and the respective addresses of the transmission source and the transmission destination.

10. The method according to claim 9, wherein said retrieving makes reference to the operational IP address if the message received is not the SM Device Annunciation, searches the live list, and executes failure management if no entry is found.

11. The method according to claim 9, wherein a timestamp is stored in the entry, and said retrieving updates the timestamp upon receipt of the SM Device Annunciation.

12. The method according to claim 11, wherein the entry is deleted from the live list if the timestamp is not updated for a given time.

13. A method for mutual translation between an IPv6 address and an Ipv4 address, comprising:

storing entries in a live list, each of the entries containing at least an identifier, an operational IP address, and a transmission IPv4 address;

storing IPv4 addresses in an IPv4 address pool;

storing translation rules in a translation rules storage section for use in translation between the IPv6 address and the IPv4 address;

retrieving the entry upon receipt of a message in field bus communication between IPv4-capable and IPv6-capable field devices connected to a field bus executing HSE (High Speed Ethernet) communications, and acquiring an IPv4 address from the IPv4 address pool if the entry is not found while preparing translation rules from the IPv4 address acquired so as to be stored in the translation rules storage section, and preparing an entry to be registered in the live list;

mutually translating between the IPv4 address and/or the IPv6 address contained in the message received by making reference to the translation rules stored in the translation rules storage section;

generating respective addresses of a transmission source and a transmission destination by making reference to the translation rules stored in the translation rules storage section; and transmitting a packet generated based on the translated IPv4 address and/or the IPv6 address of the message and the respective addresses of the transmission source and the transmission destination.

14. The method according to claim 13, wherein a timestamp is stored in the entry, and said retrieving updates the timestamp upon receipt of a message.

15. The method according to claim 14, wherein said retrieving refrains from updating the timestamp if the message received is not a SM Device Annunciation, and the entry retrieved is one prepared upon receipt of the SM Device Annunciation.

16. The method according to claim 14, wherein the entry is deleted from the live list if the timestamp is not updated for a given time.

* * * * *